United States Patent
Holzapfel (10) Patent No.: US 9,874,434 B2
(45) Date of Patent: Jan. 23, 2018

(54) POSITION-MEASURING SYSTEM, HAVING SCANNING UNITS MULTIPLEXED TO LIGHT SOURCES AND DETECTORS, FOR OPTICALLY SCANNING A MEASURING STANDARD AND METHOD FOR OPERATING SUCH A POSITION-MEASURING SYSTEM

(71) Applicant: DR. JOHANNES HEIDENHAIN GMBH, Traunreut (DE)

(72) Inventor: Wolfgang Holzapfel, Obing (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 242 days.

(21) Appl. No.: 14/565,614

(22) Filed: Dec. 10, 2014

(65) Prior Publication Data
US 2015/0168131 A1 Jun. 18, 2015

(30) Foreign Application Priority Data
Dec. 16, 2013 (DE) .......................... 10 2013 226 070

(51) Int. Cl.
G01D 5/36 (2006.01)
G01B 11/14 (2006.01)
G01D 5/26 (2006.01)

(52) U.S. Cl.
CPC ............... G01B 11/14 (2013.01); G01D 5/36 (2013.01); *G01D 5/268* (2013.01)

(58) Field of Classification Search
CPC ........... G01B 11/14; G01D 5/36; G01D 5/268
See application file for complete search history.

(56) References Cited

U.S. PATENT DOCUMENTS

| | | | |
|---|---|---|---|
| 4,546,466 A | 10/1985 | Lopiccolo | |
| 4,964,727 A | 10/1990 | Huggins | |
| 5,408,091 A | 4/1995 | Perraud et al. | |
| 5,498,867 A * | 3/1996 | Senuma | G01D 5/34715 250/226 |
| 6,054,938 A | 4/2000 | Nakajima et al. | |
| 7,573,581 B2 | 8/2009 | Holzapfel | |

FOREIGN PATENT DOCUMENTS

| | | |
|---|---|---|
| DE | 35 26 049 | 6/1986 |
| DE | 198 10 282 | 2/1999 |
| EP | 1 762 828 | 3/2007 |
| EP | 1 989 577 | 11/2008 |

OTHER PUBLICATIONS

European Search Report, dated Apr. 30, 2015, issued in corresponding European Patent Application No. 14195642.5.

* cited by examiner

*Primary Examiner* — Hwa Lee
(74) *Attorney, Agent, or Firm* — Andrews Kurth Kenyon LLP (57) ABSTRACT

A position-measuring system includes a plurality of scanning units for the optical scanning of at least one measuring standard, the scanning units being coupled optically to a plurality of light sources and a plurality of detectors. Disposed between the scanning units and the detectors are a plurality of demultiplexers, via which in each case at least two scanning units are coupled to one detector.

12 Claims, 9 Drawing Sheets

POSITION-MEASURING SYSTEM, HAVING SCANNING UNITS MULTIPLEXED TO LIGHT SOURCES AND DETECTORS, FOR OPTICALLY SCANNING A MEASURING STANDARD AND METHOD FOR OPERATING SUCH A POSITION-MEASURING SYSTEM

CROSS-REFERENCE TO RELATED APPLICATIONS

The present application claims priority to Application No. 10 2013 226 070.9, filed in the Federal Republic of Germany on Dec. 16, 2013, which is expressly incorporated herein in its entirety by reference thereto.

FIELD OF THE INVENTION

The present invention relates to a position-measuring system, e.g., having a plurality of scanning units for the optical scanning of at least one measuring standard, the scanning units being coupled optically to a plurality of light sources and a plurality of detectors. The present invention also relates to a method for operating such a position-measuring system.

BACKGROUND INFORMATION

High-precision optical position-measuring systems often include a plurality of high-resolution scanning units that are coupled optically to a plurality of light sources and detectors. Fiber optics are often provided for the optical coupling. The optical coupling of the various components, e.g., with the aid of fiber optics, is an important part of such a high-precision position-measuring system, since heat input may thereby be kept very low. Such high-precision position-measuring systems usually use plate-shaped, two-dimensional measuring standards in order to be able to generate position values with regard to a machine component movable in a two-dimensional XY-movement range. As a rule, the measuring standards used in this context must be calibrated very precisely. Such a calibration may be carried out by additional redundant sensors which sense calibration standards introduced into the respective machine. In addition, there is also the possibility of performing what is referred to as a self-calibration of the plate-shaped measuring standards by redundant scanning units of the position-measuring system. In this case, it is important that the expenditure for such additional scanning units be kept as low as possible. Up to now, however, this was not readily possible, especially given the necessary optical coupling by fiber optics for the additional scanning units.

German Published Patent Application No. 35 26 049 describes an arrangement or a position-measuring system in which the light from a light source is fed via a fiber optic to a time-division multiplexer in the form of a chopper wheel, which generates light pulses following one another in time at its N outputs. Consequently, a fiber optic is provided for the optical coupling, as well. The light pulses are subsequently fed in spatially separate manner to N sensors. The light pulses modulated by the sensors are united in a demultiplexer into one common detection fiber and are received by a single detector. The method described in this document substantially describes a time-division multiplexing method. The requisite time-division multiplexer, which must take the form of an active component, must be viewed as a crucial disadvantage of such a time-division multiplexing method. The time-division multiplexer may be mounted away from the sensors, the result of which, however, is that for N sensors, N optical detection channels or leads from the time-division multiplexer to the sensors are needed correspondingly, and the expenditure becomes correspondingly high. Alternatively, the time-division multiplexer could also be disposed adjacent spatially to the sensors. However, the power dissipation of the active time-division multiplexer will then prevent a high-precision position determination by the position-measuring system.

U.S. Pat. No. 5,408,091 describes a position-measuring system having optical sensors, that requires three pulsed light sources having different wavelengths, whose light pulses are coupled into one common fiber optic. In the immediate vicinity of N sensors, the light pulses are separated according to their wavelength by a fiber spectrometer. The fiber optic that transmits the light pulses at one of the three wavelengths is split in a fiber coupler into N fiber optics and directed via suitably different delay routes to the N sensors. They therefore receive light pulses following one another in time. The light pulses modulated by the sensors are likewise led off via fiber optics and the fiber optics are combined in a fiber coupler to form a single fiber optic. The downstream detector therefore receives light pulses following one after another in time, which are assigned to the individual sensors. Consequently, this method again represents a time-division multiplexing method, the time shift here being accomplished by suitably different delay routes. Because of the speed of light, such a time shift requires very long lengths of the fiber optics in order to ensure a time interval between the light pulses which is detectable electronically. The expenditure and the space requirements for such a position-measuring system are correspondingly high.

A position-measuring system similar to this is also described in U.S. Pat. No. 5,498,867. In elaboration of the principle described in U.S. Pat. No. 5,408,091, there, the light pulses of a spectrally wide-band light source are coupled into one fiber optic and changed into M spectrally narrow-band light pulses in a fiber spectrometer. These spectrally narrow-band light pulses are fed via separate fiber optics to M groups of sensors. Each of the M groups of sensors contains one fiber coupler which in each case splits the fiber optic into N fiber optic and directs them via different delay routes to the N sensors of each group. Therefore, M×N sensors are supplied by one light source and one fiber optic, respectively. The light pulses modulated by the M×N sensors are united via a fiber coupler in one common fiber optic and ultimately fed to a spectrometer which conducts the M spectrally narrow-band light pulses to M detectors. Each of the M detectors detects the associated group of sensors in a time-division multiplexing method. Therefore, the method described in U.S. Pat. No. 5,498,867 may be referred to as a mixed time-division and wavelength multiplexing method. Due to the different wavelengths, the sensors must be adapted for these wavelengths. However, in a position-measuring system having a single plate-shaped measuring standard scanned by all scanning units, such an adaptation is not possible, since the grating structure (especially the phase height) of the measuring standard can only be optimized for a single wavelength.

SUMMARY

Example embodiments of the present invention provide a position-measuring system, and a method for operating a position-measuring system, in which the position-measuring system includes a plurality of scanning units for the optical scanning of one or more measuring standards, the scanning units being coupled optically to a plurality of light sources and a plurality of detectors. An intention is to minimize to the greatest extent possible the number of illuminating channels and/or detection channels needed for the feeding and leading-off of light.

According to an example embodiment of the present invention, a position-measuring system includes a plurality of scanning units for the optical scanning of at least one measuring standard, the scanning units being coupled optically to a plurality of light sources and a plurality of detectors. Situated between the scanning units and the detectors are a plurality of demultiplexers, via which in each case at least two scanning units are coupled to one detector.

Preferably, the light sources are implemented such that they are operable in pulsed fashion one after another in time, the light sources being coupled to all scanning units via a plurality of multiplexers, which in each case split one primary input-side illuminating channel of a light source onto a plurality of secondary illuminating channels on the output side and direct it to the various scanning units.

In addition, the scanning units may be implemented such that per scanning unit, a plurality of phase-shifted optical scanning signals are able to be generated that in each instance, are able to be routed via a plurality of primary detection channels to the demultiplexers on the input side, which in each case combine the routed primary detection channels on the output side onto one secondary detection channel and direct it to one detector.

It is possible to dispose single-mode fiber optics between the light sources and the scanning units for the optical coupling.

It may further be provided to dispose multimode fiber optics between the scanning units and the detectors for the optical coupling.

In this context, for the optical coupling freely-propagating beam paths may be formed between the light sources and the scanning units and/or freely-propagating beam paths may be formed between the scanning units and the detectors.

In addition, it is possible that in each case the light sources emit radiation having the same wavelength.

The plurality of light sources operable in pulsed fashion one after another in time may take the form of an assembly that includes a single light source operable in pulsed fashion, one splitting element, and a plurality of delay routes.

In addition, the multiplexer may take the form of a splitting grating which is located on a scanning plate in the scanning beam path.

In this case, the multiplexer may include a beam-splitting mirror.

In addition, the demultiplexer may include a plurality of gratings.

It is also possible to integrate the multiplexer and the demultiplexers into the scanning optics of the scanning unit.

In this case, several scanning gratings of the scanning optics may act as multiplexer and other scanning gratings of the scanning optics may act as demultiplexer.

According to an example embodiment of the present invention, in a method for operating a position-measuring system having a plurality of scanning units for the optical scanning of at least one measuring standard, the scanning units are coupled optically to a plurality of light sources and a plurality of detectors. The phase-shifted scanning signals of at least two scanning units are supplied to one detector via a plurality of demultiplexers disposed between the scanning units and the detectors.

In this context, the light sources may be operated in pulsed fashion one after another in time, the light sources being coupled to all scanning units by a plurality of multiplexers, via which in each case one input-side primary illuminating channel of a light source is split onto a plurality of secondary illuminating channels on the output side and directed to the various scanning units; and the plurality of optical scanning signals generated per scanning unit are in each case routed over a plurality of primary detection channels to the demultiplexers on the input side, via which the routed primary detection channels are combined in each instance on the output side onto one secondary detection channel and directed to one detector.

In the position-measuring system, the number of illuminating channels and/or detection channels necessary for the feeding and leading off of light, and with that, for example, the number of fiber optics required, may be minimized.

The small number of illuminating channels and/or detection channels for the light feed and light lead-off is advantageous not only in position-measuring systems having redundant scanning units, but is also usable in position-measuring systems which include a plurality of scanning units for the separate coverage of several spatial degrees of freedom. If the illuminating channels and/or detection channels for the light feed and light lead-off include fiber optics, then, if the scanning units are mounted on moving tables which must be positioned very precisely, the small number of fiber optics is considered to be advantageous as well, since the fiber optics continually transmit disturbance forces to these tables.

Further features and aspects of example embodiments of the present invention are described in more detail below with reference to the appended Figures.

DETAILED DESCRIPTION

Before three exemplary embodiments of the position-measuring system are described in detail with reference to FIGS. 3a to 6c, several initial considerations in connection therewith are described with reference to FIGS. 1 and 2.

Figure 1:
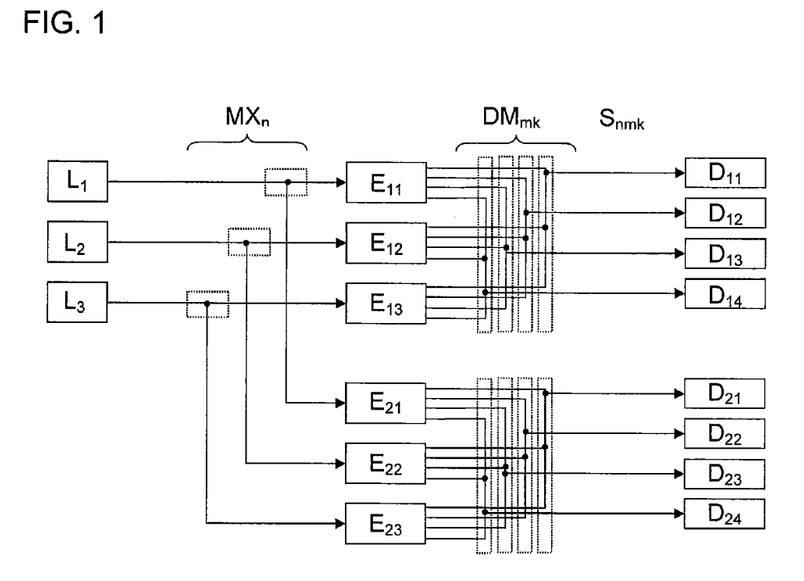
FIG. 1 schematically illustrates a position-measuring system according to an example embodiment of the present invention.

The position-measuring system illustrated in FIG. 1 includes N light sources $L_n$ (n=1, 2, ... N; e.g., N=3), which are operated in pulsed fashion one after another in time. In the example illustrated, the various illuminating channels and detection channels are formed with the aid of fiber optics. As explained below, this is not absolutely necessary. The various light sources $L_n$ each emit radiation having the identical or the nearly identical wavelength $\lambda$. In this context, a wavelength range $\lambda+\Delta\lambda$ with a wavelength tolerance Δλ<λ/20 is referred to as nearly identical wavelength λ. The N outgoing fiber optics, coupled to light sources $L_n$, which are referred to hereinafter as primary illuminating fibers or primary illuminating channels, are in each case directed to a multiplexer $MX_n$ (n=1, 2, ... N), which splits one primary illuminating fiber at the input into M fiber optics (here M=2) at the output (1×M multiplexer). The N·M fiber optics (here N·M=6) at the output of multiplexers $MX_n$ are referred to in the following as secondary illuminating fibers or secondary illuminating channels. The secondary illuminating fibers are each connected to a scanning unit $E_{nm}$, so that N·M scanning units $E_{nm}$ (n=1, 2, ... N; m=1, 2, ... M) are able to be supplied with light. Each of the N·M scanning units $E_{nm}$ furnishes K phase-shifted, optical scanning signals $S_{nmk}$ (k=1, 2, ... K; here K=4), which are conducted away in K fiber optics. The total of N·M·K fiber optics (here N·M·K=24) are referred to hereinafter as primary detection fibers or primary detection channels. The K primary detection fibers of the N·M scanning units $E_{nm}$ are divided into K·M groups of N primary detection fibers each. This is accomplished such that in each group, only scanning units $E_{nm}$ are assigned which are supplied by different light sources $L_n$. Each such group of primary detection fibers is connected to a demultiplexer $DM_{mk}$ (m=1, 2, ... M; k=1, 2, ... K), which combines all incoming primary detection fibers onto one outgoing, so-called secondary detection fiber or secondary detection channel (N×1 demultiplexer). Therefore, there are K·M secondary detection fibers (here K·M=8), which in each instance are connected to a detector $D_{mk}$ (m=1, 2, ... M; k=1, 2, ... K), in order to convert the corresponding light pulses into electrical current pulses for further processing.

Via the multiplexer provided here, one primary illuminating fiber or one primary illuminating channel is split into a plurality of secondary illuminating fibers or secondary illuminating channels. Correspondingly, a demultiplexer combines a plurality of primary detection fibers or a plurality of detection channels onto one secondary illuminating fiber or one secondary illuminating channel. The functions of multiplexer and demultiplexer are therefore complementary to one another, so that identical components may be used for them. The multiplexers used should have as similar a response characteristic as possible in the case of the splitting onto the plurality of secondary illuminating fibers or secondary illuminating channels, so that in particular, the intensities of the light pulses in the secondary illuminating fibers or secondary illuminating channels are to a great extent identical (within ±20%). Analogous to that, the response characteristic of the demultiplexers should also be largely identical, so that equally strong light pulses in the plurality of primary detection fibers or primary detection channels result in equally strong light pulses in the outgoing secondary detection fiber or in the secondary detection channel. Moreover, losses of the multiplexers or demultiplexers due to absorption, scattering, or back-reflection should be as minimal as possible. For example, multiplexers and demultiplexers may be provided in the form of optical waveguides on a glass substrate with Y-shaped branching elements. Alternatively, fiber optics may also be fused by splicing to form Y-shaped branching elements. European Published Patent Application No. 1 989 577, which is expressly incorporated herein in its entirety by reference thereto, for example, describes models of multiplexers and demultiplexers suitable for this purpose.

Via the configuration described, scanning unit $E_{nm}$ is connected to light source $L_n$ and detectors $D_{mk}$ in the position-measuring system. If light source $L_n$ is pulsed, then all M connected scanning units $E_{nm}$, m=1, 2, ... M are supplied with a light pulse simultaneously, and output optically modulated scanning signals $S_{nmk}$ (m=1, 2, ... M; k=1, 2, ... K) which are detected separately by detectors $D_{mk}$ (m=1, 2, ... M; k=1, 2, ... K). Upon the following pulse of next light source $L_{n+1}$, scanning units $E_{n+1m}$, m=1, 2, ... M are supplied with light and deliver optically modulated scanning signals $S_{n+1mk}$ (m=1, 2, ... M; k=1, 2, ... K), which are detected by the same detectors $D_{mk}$ (m=1, 2, ... M; k=1, 2, ... K).

The basic principle of the position-measuring system explained with reference to FIG. 1 requires only N light sources and M·K detectors in order to operate N·M scanning units having K fiber outputs each. The underlying multiplexing method hereof may be referred to as a combined time-division/detection multiplexing method. N·M scanning units are able to be operated with the N light sources $L_n$ and the M groups of K detectors $D_{mk}$ (k=1, 2, ... K) each, which therefore differs from the pure time-division multiplexing method described in German Published Patent Application No. 35 26 049 mentioned above, in which N·M light sources and K detectors are needed to operate N·M scanning units.

The case without any multiplexing, that is, each scanning unit has its own light source and its own detectors, may also be compared with the procedure hereof. A corresponding comparison is summarized in the following table:

| multiplexing method | number of light sources | number of detectors | number of scanning units |
|---|---|---|---|
| without multiplexing (conventional) | 1 | N · M · K | N · M |
| time-division multiplexing (conventional) | N · M | K | N · M |
| combined time-division/detection multiplexing | N | M · K | N · M |

The method without multiplexing therefore represents the limiting case of a combined time-division/detection multiplexing method for N=1. Analogously, the time-division multiplexing method represents the limiting case for M=1.

Given a predefined number Z=N·M of scanning units, the combined time-division/detection multiplexing method described herein requires N fiber optics for the light feed (primary illuminating fibers or primary illuminating channels) and M·K fiber optics for the light lead-off (secondary detection fibers or secondary detection channels), that is, a total of N+M·K fiber optics. Therefore, p fiber optics are needed per scanning unit, where $$p = \frac{N + M \cdot K}{Z} = \frac{1}{M} + \frac{M \cdot K}{Z} \quad \text{(Equation 1)}$$

Given a predefined number Z of scanning units and predefined number K of detection fibers per scanning location, p may be minimized, and from that, an optimal value $M_{opt} \geq 1$ of multiplexer $MX_n$ may be determined:

$$M_{opt} = \text{Max}\left(\text{Round}\left(\sqrt{\frac{Z}{K}}\right), 1\right) \quad \text{(Equation 2)}$$

In this context, round( ) represents the rounding of the argument to the next whole number, and Max( ) represents the maximum value among the arguments.

Also resulting from this is the optimal number $N_{opt}$ of light sources:

$$N_{opt} = \text{Ceil}\left(\frac{Z}{M_{opt}}\right) \quad \text{(Equation 3)}$$

In this context, Ceil( ) represents a function for rounding off the argument to the next-larger whole number.

Figure 2:
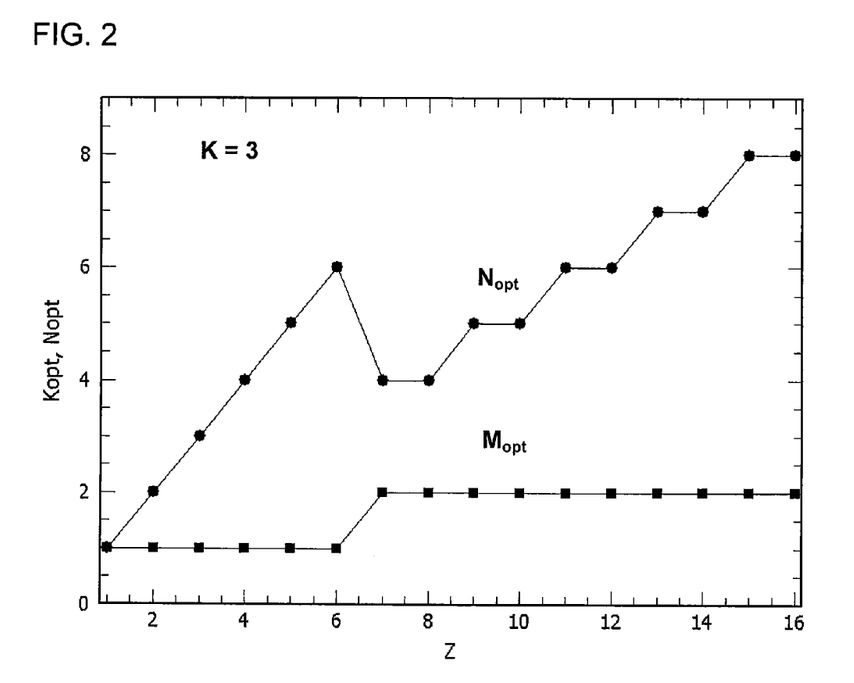
FIG. 2 illustrates the correlation between the number of scanning locations and the optimal number of light sources in the position-measuring system.

FIG. 2 illustrates the characteristics of $M_{opt}$ and $N_{opt}$ as a function of Z for a predefined K=3. For a typical example with Z=8 and K=3, the result is $M_{opt}$=2 and $N_{opt}$=4. It is also illustrated in FIG. 2 that, except in the trivial case Z=1, a method without multiplexing (i.e., N=1) is never optimal. For Z≤6, the optimal solution according to FIG. 2 is $M_{opt}$=1 and $N_{opt}$=Z. This corresponds to the time-division multiplexing method. For Z>6, the combined time-division/detection multiplexing method is more favorable.

Moreover, in this connection, it must be taken into consideration that in the event fiber optics are provided for the optical coupling, the expenditure for additional light sources as well as additional illuminating fibers, which usually must be provided as costly single-mode fibers, is markedly higher than that for additional detectors and detection fibers, which usually may take the form of simple multimode fibers. That is why, differing from equations 2 and 3, it is usually more advantageous to reduce the number N of light sources, and instead to increase the number M·K of detectors. That means that the combined time-division/detection multiplexing method is advantageous for Z≤6, as well.

The light conduction or optical coupling in the various illuminating and detection channels does not have to be carried out exclusively by fiber optics in the position-measuring device. For example, freely-propagating beam paths without fiber optics may also be formed for the optical coupling between the light sources and the scanning units and/or between the scanning units and the detectors. For example, multiplexers $MX_n$ and/or demultiplexers $DM_{mk}$ may be arranged as free-beam optics with suitable beam splitters and/or gratings. The primary and/or secondary illuminating channels may also be replaced partially or completely by free-beam optics. In this case, the corresponding light beams would be referred to as primary or secondary illuminating beams of rays. Something similar holds true for the primary and secondary detection channels, which likewise may be formed partially or completely as free-beam optics. In this case, the corresponding beams of rays would then be referred to as primary or secondary detection beams of rays.

Figure 3A:
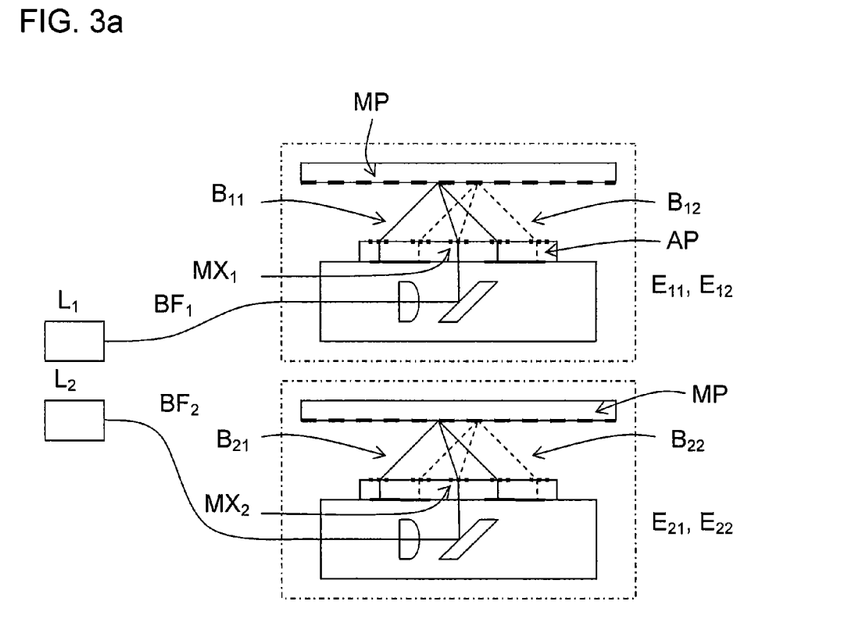
FIGS. 3a and 3b are schematic partial views of the scanning beam path in a first exemplary embodiment of the position-measuring system.
Figure 3B:
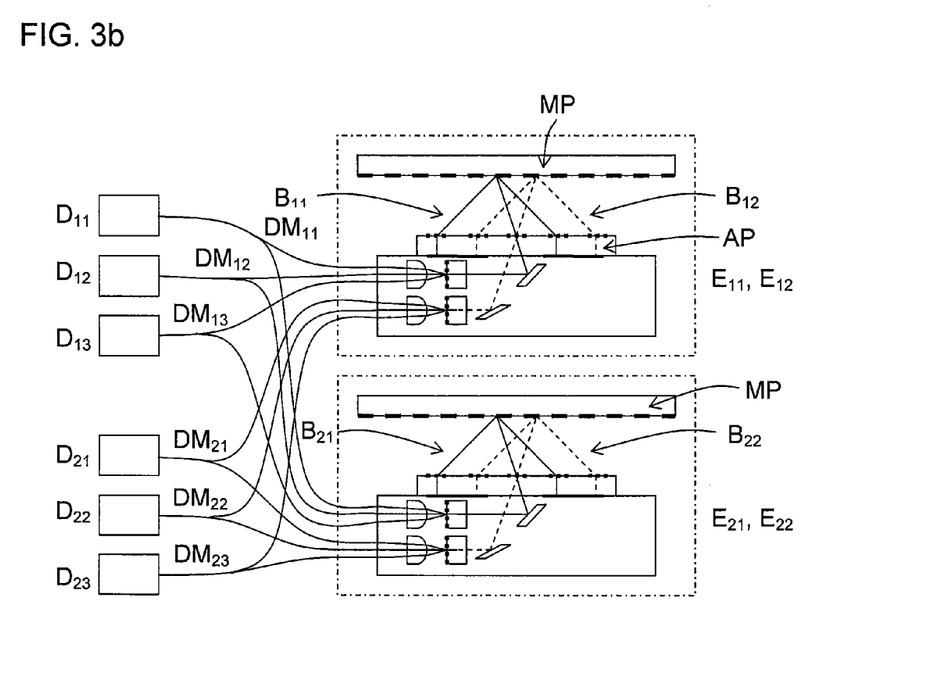

A first exemplary embodiment of the position-measuring system is explained below with reference to FIGS. 3a and 3b. FIG. 3a illustrates the scanning beam path from the two light sources $L_1$, $L_2$ provided up to the four scanning units $E_{11}$, $E_{12}$, $E_{21}$, $E_{22}$. FIG. 3b illustrates the scanning beam path from the four scanning units $E_{11}$, $E_{12}$, $E_{21}$, $E_{22}$ up to the six detectors $D_{11}$, $D_{12}$, $D_{13}$, $D_{21}$, $D_{22}$, $D_{23}$.

Merely for reasons clarity, scanning units $E_{11}$, $E_{12}$, $E_{21}$, $E_{22}$ and plate-shaped measuring standards MP are illustrated superposed in FIGS. 3a and 3b. Scanning units $E_{11}$, $E_{12}$, $E_{21}$, $E_{22}$ normally scan the same plate-shaped measuring standards MP, which are disposed in one common measuring plane.

In the illustrated example embodiment of the position-measuring system, two light sources $L_1$ and $L_2$ (N=2) are provided, which are coupled optically to scanning units $E_{11}$ and $E_{12}$ or $E_{21}$ and $E_{22}$ via two primary illuminating fibers $BF_1$ and $BF_2$ in the form of single-mode fiber optics. The respective emergent primary illuminating beams of rays are collimated and in each case routed via a reflecting mirror to a multiplexer $MX_1$ or $MX_2$ in the form of a splitting grating. Multiplexers $MX_1$ and $MX_2$ in each instance split the primary illuminating beams of rays falling on them into two secondary illuminating beams of rays (M=2). The further beam path is only illustrated schematically in FIGS. 3a and 3b. European Published Patent Application No. 1 762 828, which is expressly incorporated herein in its entirety by reference thereto, describes a possible scanning beam path. Beam paths $B_{11}$ and $B_{21}$ of scanning units $E_{11}$ and $E_{21}$, respectively, are indicated in FIGS. 3a and 3b by solid lines, and beam paths $B_{12}$ and $B_{22}$ of scanning units $E_{12}$ and $E_{22}$ are indicated with broken lines.

Beam paths $B_{11}$, $B_{12}$, $B_{21}$, $B_{22}$ of all four scanning units $E_{11}$, $E_{12}$, $E_{21}$, $E_{22}$ include partial areas having a beam tilt perpendicular to the drawing plane of FIGS. 3a, 3b. In this manner, a beam displacement is obtained perpendicular to the drawing plane of FIGS. 3a and 3b, so that the optical elements in FIG. 3a used for the scanning are offset relative to those in FIG. 3b perpendicular to the drawing plane.

In the present exemplary embodiment, each of the four scanning units $E_{11}$, $E_{12}$, $E_{21}$, $E_{22}$ supplies three optical scanning signals (K=3), which are coupled into primary detection fibers in the form of multimode fiber optics. The primary detection fibers of scanning units $E_{11}$ and $E_{21}$ are routed by pairs to demultiplexers $DM_{11}$, $DM_{12}$ and $DM_{13}$, which in each instance recombine the modulated scanning signals of both scanning units $E_{11}$ and $E_{21}$ on the output side onto three secondary detection fibers. Demultiplexers $DM_{11}$, $DM_{12}$ and $DM_{13}$ in this exemplary embodiment are formed as Y-fiber branching elements by splicing. The secondary detection fibers then transmit the optical scanning signals to corresponding detectors $D_{11}$, $D_{12}$ and $D_{13}$, respectively. Analogous to that, the primary detection fibers of scanning units $E_{12}$ and $E_{22}$ are also routed by pairs to demultiplexers $DM_{21}$, $DM_{22}$ and $DM_{23}$. The corresponding three secondary detection fibers conduct the scanning signals from demultiplexers $DM_{21}$, $DM_{22}$ and $DM_{23}$ to assigned detectors $D_{21}$, $D_{22}$ and $D_{23}$, respectively. Polarization-optical components bring about a phase shift of the three scanning signals generated by each scanning unit $E_{11}$, $E_{12}$, $E_{21}$, $E_{22}$ of 120° relative to each other.

In this exemplary embodiment of the position-measuring system, two light sources $L_1$, $L_2$ as well as six detectors $D_{11}$, $D_{12}$, $D_{13}$, $D_{21}$, $D_{22}$, $D_{23}$ are used for four scanning units $E_{11}$, $E_{12}$, $E_{22}$, $E_{22}$. Altogether, two primary illuminating fibers $BF_1$, $BF_2$ and six secondary detection fibers are used. Consequently, only a total of eight fiber optics must be run between the scanning units and a light source/detector unit. Without the use of the plurality of demultiplexers, fourteen fiber optics would instead have to be provided. That means that in this example embodiment of the position-measuring system, the number of fiber optics required is reducible to 57% compared to conventional systems.

In the present first exemplary embodiment, the multiplexer is already integrated as a splitting grating in the scanning unit. The demultiplexers additionally needed over and above that may be integrated exclusively into the optical-fiber path. A further adaptation of the scanning units is therefore not necessary. In principle, any scanning units may be used without further design changes, since the multiplexers and demultiplexers additionally needed may be integrated exclusively into the optical-fiber paths. The scanning units provided may be disposed as needed relative to the measuring standard, so that a precise position determination and/or a precise self-calibration is thereby possible.

A second exemplary embodiment of the position-measuring system is explained with reference to FIGS. 4a to 4e. Two light sources $L_2$, $L_2$ (N=2) are provided, which are connected via the two primary illuminating fibers $BF_2$, $BF_2$ to in each case four scanning units $E_{11}$, $E_{12}$, $E_{13}$, $E_{14}$ and $E_{21}$, $E_{22}$, $E_{23}$, $E_{24}$, respectively, so that the position-measuring system in this example embodiment includes a total of eight scanning units $E_{11}$, $E_{12}$, $E_{13}$, $E_{14}$, $E_{21}$, $E_{22}$, $E_{23}$, $E_{24}$ (Z=8), which are usable for determining position and/or self-calibration.

Figure 4A:
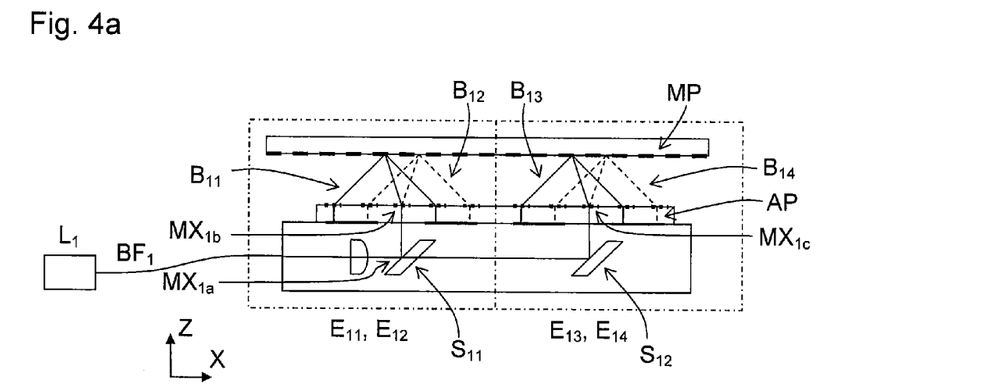
FIGS. 4a to 4e are schematic partial views of a second exemplary embodiment of the position-measuring system.

As illustrated in FIG. 4a, the beam of rays of light source $L_1$ exiting from illuminating fiber $BF_1$ is collimated via collimator optics and split by a beam-splitting mirror $S_{11}$. In this exemplary embodiment, beam-splitting mirror $S_{11}$ acts as a first multiplexer $MX_{1a}$. The partial beam of rays reflected at beam-splitting mirror $S_{11}$ then strikes a second multiplexer $MX_{1b}$, taking the form of a splitting grating, similarly as in the first exemplary embodiment explained above. The partial beam of rays transmitted at beam-splitting mirror $S_{11}$ arrives via mirror $S_{12}$ at a third multiplexer $MX_{1c}$, likewise in the form of a splitting grating. In this context, all three multiplexers $MX_{1a}$, $MX_{1b}$, $MX_{1c}$ act together as one multiplexer with fourfold splitting (M=4).

Figure 4B:
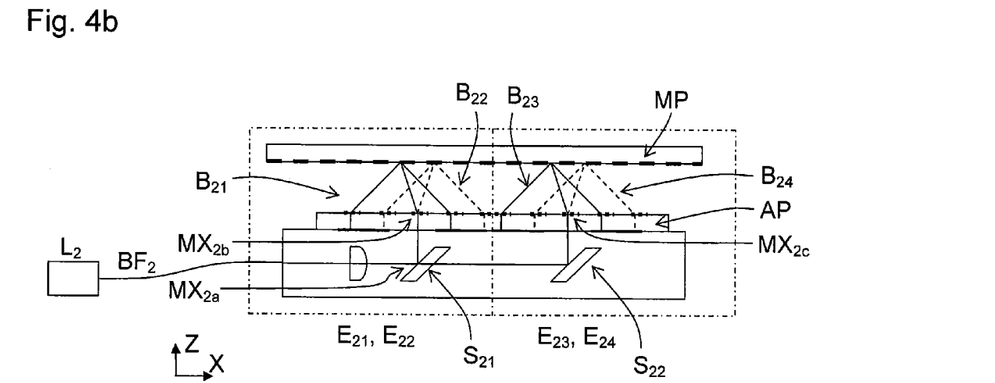

Analogous to that, as illustrated in FIG. 4b, after passing through primary illuminating fiber $BF_2$, the beam of rays emitted by second light source $L_2$ is likewise split four times via multiplexers $MX_{2a}$, $MX_{2b}$ and $MX_{2c}$.

As in the first exemplary embodiment, beam paths $B_{22}$, $B_{23}$, $B_{22}$, $B_{23}$ are again represented with solid lines, and beam paths $B_{12}$, $B_{14}$, $B_{22}$, $B_{24}$ are represented with broken lines. For a detailed description of suitable scanning optics, reference is again made to European Published Patent Application No. 1 762 828, which is expressly incorporated herein in its entirety by reference thereto.

Figure 4C:
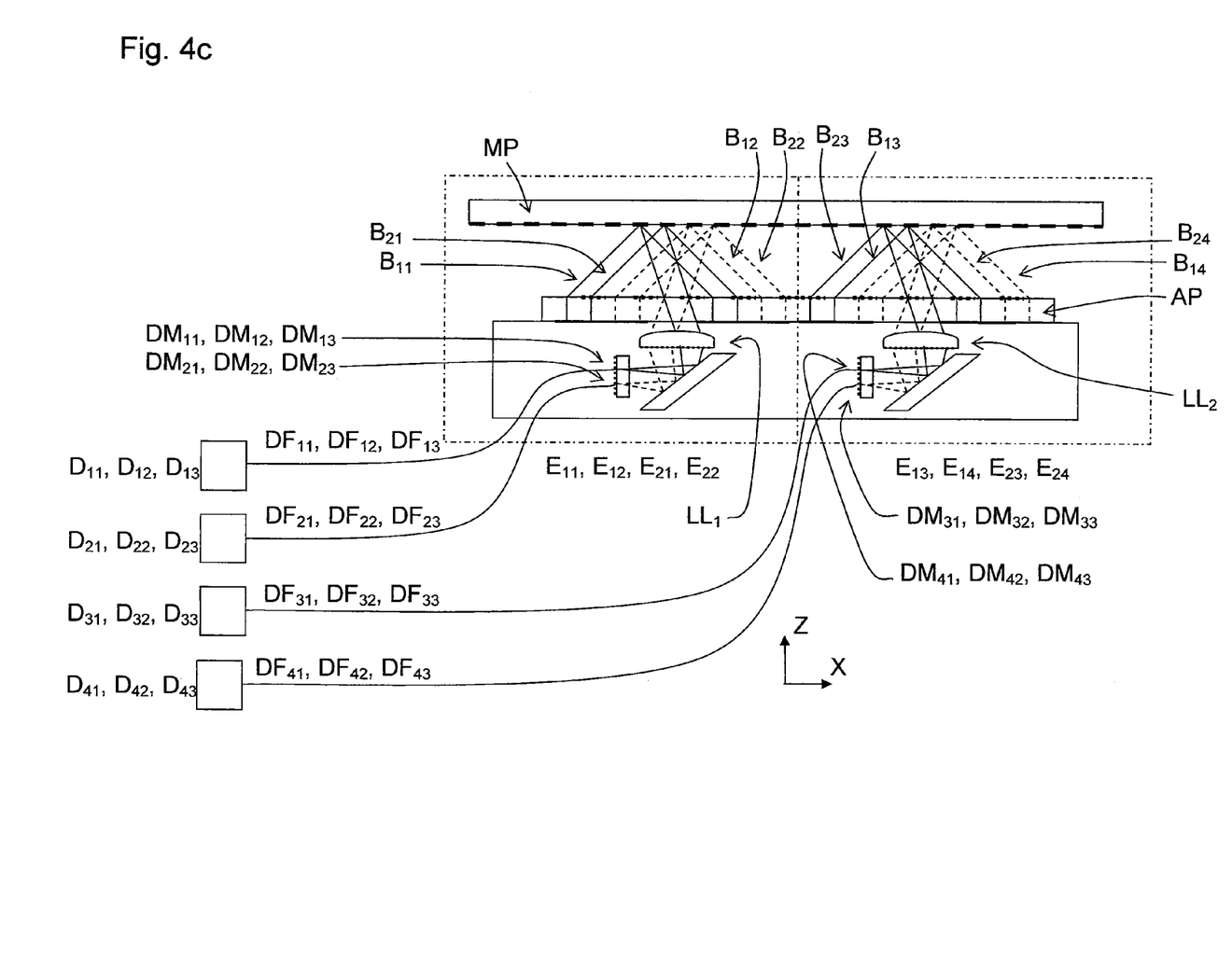
Figure 4D:
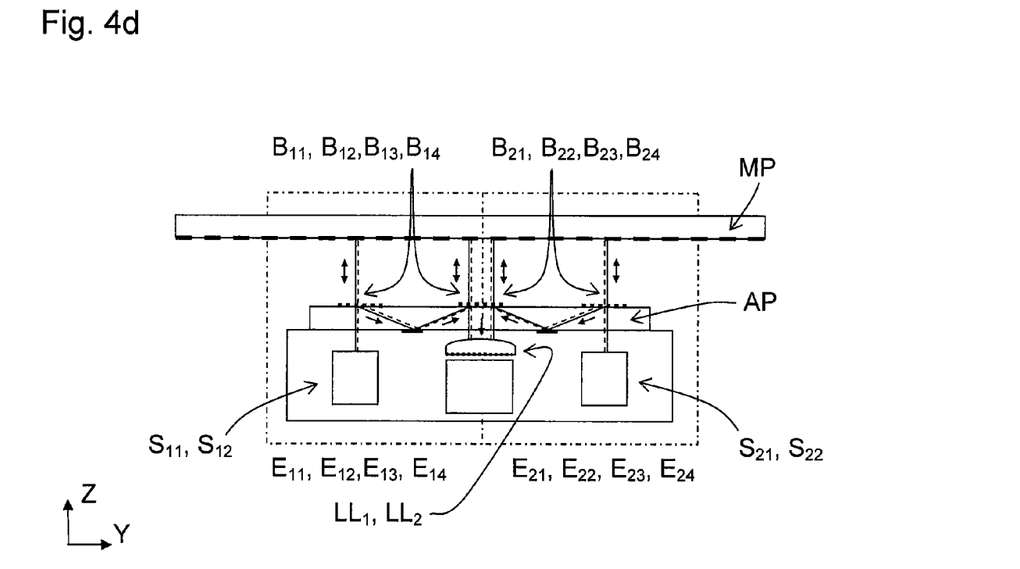

The respective beam paths according to FIG. 4a and according to FIG. 4b are disposed side by side in the Y-direction. FIG. 4d is a transverse view of this exemplary embodiment.

Figure 4E:
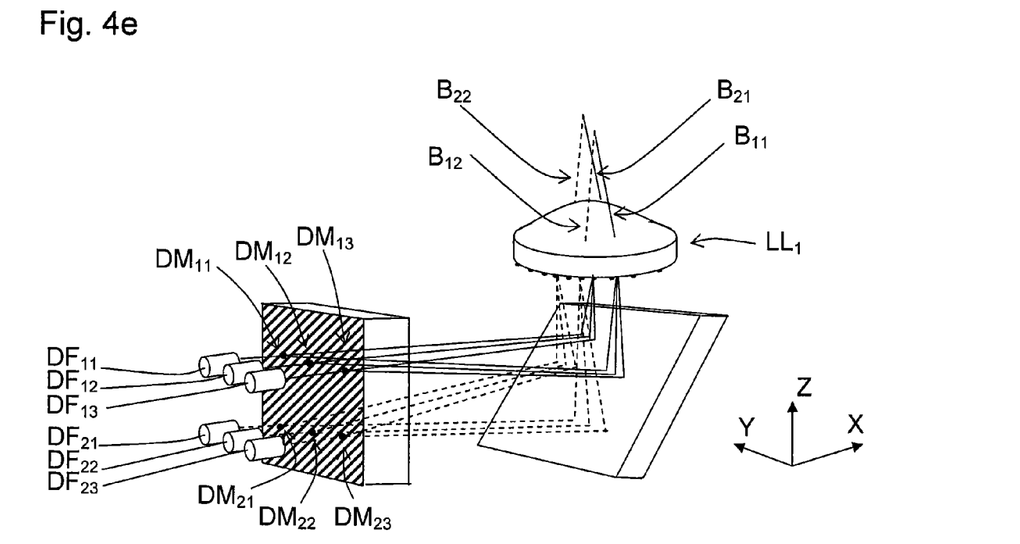

After the splitting by the various multiplexers, the partial beams of rays are guided in the direction of plate-shaped measuring standard MP, where after a diffraction in measuring direction X, they are deflected by scanning gratings on the upper side of a scanning plate AP in the Y-direction. The scanning gratings are in the form of diffractive diffraction gratings which combine several optical functions. As described in European Published Patent Application No. 1 762 828, they focus the partial beams of rays falling on them in the Y-direction onto mirrors on the bottom side of scanning plate AP. Further scanning gratings on the upper side of scanning plate AP again collimate the partial beams of rays reflected by the mirrors, and direct them once more to measuring standard MP. As illustrated, for example, in FIG. 4d, a beam displacement of the partial beams of rays thereby comes about in the Y-direction between the first and second impingement on measuring standard MP. According to FIG. 4d, the partial beams of rays, which come from light sources $L_1$, $L_2$, are first guided via mirrors $S_{11}$, $S_{12}$ and $S_{21}$, $S_{22}$, respectively, to measuring standard MP, and then displaced toward the middle in the Y-direction, so that after the second diffraction at the measuring standard, all partial beams of rays of scanning units $E_{11}$, $E_{12}$, $E_{21}$, $E_{22}$ and of scanning units $E_{13}$, $E_{14}$, $E_{23}$, $E_{24}$ strike lenses $LL_1$ and $LL_2$, respectively. The entire beam path after the reflections at the mirrors on the back side of scanning plate AP up to detectors $D_{11} \ldots D_{43}$ is illustrated in FIG. 4c. The beam path from lens $LL_2$ up to detection fibers $DF_{12}$, $DF_{12}$, $DF_{13}$, $DF_{21}$, $DF_{22}$, $DF_{23}$ is illustrated in the perspective view of FIG. 4e. The beam path from lens $LL_2$ up to detection fibers $DF_{31}$, $DF_{32}$, $DF_{33}$, $DF_{41}$, $DF_{42}$, $DF_{43}$ takes a course analogous to that. Lens $LL_1$ focuses the incident partial beams of rays via a reflecting mirror onto gratings $DM_{11}$, $DM_{12}$, $DM_{13}$, $DM_{22}$, $DM_{22}$, $DM_{23}$ which are located on one common substrate. In addition, located on the bottom side of lens $LL_1$ is a splitting grating that splits each of the four incident partial beams of rays into a zeroth, +1st and −1st order of diffraction in the Y-direction (K=3), which furnish scanning signals phase-shifted relative to each other by polarization-optical components. The 12 partial beams of rays strike in pairs at the same focus location on gratings $DM_{11}$, $DM_{12}$, $DM_{13}$, $DM_{21}$, $DM_{22}$, $DM_{23}$, since the partial beams of rays impinging on lens $LL_1$ are parallel to each other by pairs, and therefore are conducted to the same focus location. Gratings $DM_{11}$, $DM_{12}$, $DM_{13}$, $DM_{21}$, $DM_{22}$, $DM_{23}$ are used to direct the pairs of partial beams of rays, which have the same focus location, in the same direction as well, by diffraction in the 1st or −1st order of diffraction. These pairs of partial beams of rays may thereby be coupled into the same detection fiber. Thus, in this exemplary embodiment, gratings $DM_{11}$, $DM_{12}$, $DM_{13}$, $DM_{21}$, $DM_{22}$, $DM_{23}$ act as demultiplexer. Substantially identical grating structures usually result for gratings $DM_{11}$, $DM_{12}$, $DM_{13}$, $DM_{21}$, $DM_{22}$, $DM_{23}$, so that, as illustrated in FIG. 4e, they may be implemented as planar gratings. For reasons of clarity, in FIG. 4e, detection fibers $DF_{11}$, $DF_{12}$, $DF_{13}$, $DF_{21}$, $DF_{22}$, $DF_{23}$ are illustrated somewhat offset in beam direction −X, but are in close contact with gratings $DM_{11}$, $DM_{12}$, $DM_{13}$, $DM_{21}$, $DM_{22}$, $DM_{23}$.

In this exemplary embodiment of the position-measuring system, by a simple configuration as illustrated in FIG. 4e, in each case 12 partial beams of rays are able to be coupled via only a few optical components such as lens $LL_1$, the reflecting mirror and the shared multiplexer in the form of a grating, into six secondary detection fibers $DF_{11}$, $DF_{12}$, $DF_{13}$, $DF_{21}$, $DF_{22}$, $DF_{23}$. A complicated beam alignment of the individual partial beams of rays is therefore not necessary, which reduces the expenditure and the construction size considerably. The use of one common scanning plate AP for all eight scanning units $E_{11}$, $E_{12}$, $E_{21}$, $E_{22}$, $E_{13}$, $E_{14}$, $E_{23}$, $E_{24}$ yields an especially compact type of construction and a very drift-stable behavior. Consequently, four measured position values are available for measuring direction X, and four measured position values for measuring direction Z.

Scanning units $E_{11}$, $E_{12}$, $E_{21}$, $E_{22}$ and $E_{13}$, $E_{14}$, $E_{23}$, $E_{24}$, respectively, scan measuring standard MP at different scanning locations. The placement of these scanning locations is crucial for an acceptable self-calibration of measuring standard MP. Therefore, in this example embodiment, the scanning locations of scanning units $E_{11}$, $E_{12}$, $E_{13}$, $E_{14}$ are set apart in the Y-direction relative to the scanning locations of scanning units $E_{21}$, $E_{22}$, $E_{23}$, $E_{24}$. In measuring direction X, the scanning locations of scanning units $E_{11}$, $E_{12}$ and $E_{21}$, $E_{22}$ and $E_{13}$, $E_{23}$ and $E_{23}$, $E_{24}$, respectively, are in each case shifted in pairs and are selectable by the X-position of mirrors $S_{11}$, $S_{12}$, $S_{21}$, $S_{22}$.

A third exemplary embodiment of the position-measuring system is explained with reference to FIGS. 5a, 5b and 6a to 6c. In this case, eight scanning units (Z=8) and two light sources $L_1$, $L_2$ (N=2) are provided. While in the first two example embodiments, the multiplexers and demultiplexers, respectively, are located upstream of the splitting of the two interfering partial beams of rays or downstream of their recombination, in the present third exemplary embodiment, it is provided to integrate the multiplexers and demultiplexers into the part of the scanning optics in which the two interfering partial beams of rays are split.

The beam path of the third exemplary embodiment is explained in the following as an example on the basis of FIG. 5b, in which, however, for reasons of clarity, only a part of the beam path of FIG. 5a with only two scanning units and one light source $L_1$ is illustrated.

Fiber-coupled light source $L_1$ supplies light pulses to an illuminating unit $BE_1$, which includes a collimator lens and possibly a reflecting mirror, and emits a collimated beam of rays in the direction of measuring standard MP. Measuring standard MP bears a linear grating or a two-dimensional cross grating on the bottom side. Between illuminating unit $BE_1$ and measuring standard MP is a scanning plate AP having a plurality of scanning gratings $AG_{10}$ to $AG_{14}$, $AG_{A1}$ to $AG_{A4}$ on the upper side facing the measuring standard and mirrors $SP_{1A1}$ to $SP_{1A4}$ on the opposite lower side. The collimated beam of rays incoming from illuminating unit $BE_1$ strikes a scanning grating $AG_{10}$, which splits the incident beam of rays in the +1st and −1st order of diffraction into two partial beams of rays. Scanning grating $AG_{10}$ is used here as first multiplexer ($M_1$=2). Both split partial beams of rays then propagate to measuring standard MP, where they are diffracted and split at so-called scanning-location pair $RM_1$ in the +1st and −1st order of diffraction into in each case two further partial beams of rays. They then propagate to scanning gratings $AG_{11}$, $AG_{12}$, $AG_{13}$, $AG_{14}$, which combine several optical functions in a single grating structure. First of all, the partial beams of rays are deflected in the X-direction and Y-direction. Secondly, they are focused transversely to measuring direction X by a cylindrical-lens function onto assigned mirrors $SP_{1A1}$ to $SP_{1A4}$ on the lower side of scanning plate AP. After being reflected at mirrors $SP_{1A1}$ to $SP_{1A4}$, the partial beams of rays are collimated again by scanning gratings $AG_{A1}$ to $AG_{A4}$ on the upper side of scanning plate AP transversely to measuring direction X, and deviated in the X-direction and Y-direction such that the individual partial beams of rays in each case are antiparallel relative to their original direction after the first diffraction at measuring standard MP. At scanning-location pair $RM_A$, they then impinge a second time on measuring standard MP, where they are once more diffracted in the +1st or −1st order of diffraction and superposed, that is, are brought to interference, with in each case a second partial beams of rays. By additional optical elements, which are omitted in FIGS. 5a and 5b for the sake of clarity, the two superposed partial beams of rays, that belong to the two scanning units illustrated in FIG. 5b, are in each case polarized perpendicularly relative to each other. They propagate to detectors $DE_1$ and $DE_2$, where they are converted in conventional manner into three phase-shifted optical scanning signals with the aid of polarization-optical components. The scanning signals are coupled into three detection fibers (K=3) and fed to associated detectors $D_{11}$, $D_{12}$, $D_{13}$ and $D_{21}$, $D_{22}$, $D_{23}$, respectively. With regard to a detailed description of these scanning optics, reference is made again to European Published Patent Application No. 1 762 828. The offset of the two scanning-location pairs $RM_1$ and $RM_A$ on measuring standard MP is determined by the deflecting function of scanning gratings $AG_{11}$, $AG_{12}$, $AG_{13}$, $AG_{14}$ and $AG_{A1}$ to $AG_{A4}$ in the X-direction and Y-direction and is selectable within wide limits.

In contrast to the scanning described in European Published Patent Application No. 1 762 828, in the present exemplary embodiment of the position-measuring system, scanning gratings $AG_{11}$ to $AG_{14}$ are modified such that they act as a second multiplexer with a twofold splitting ($M_2$=2), so that $M=M_1 \cdot M_2=4$ applies. To that end, scanning gratings $AG_{11}$ to $AG_{14}$ are furnished with an additional beam-splitting function which, from one incoming partial beam of rays, generates two exiting partial beams of rays. The two exiting partial beams of rays are formed by the layout of scanning gratings $AG_{11}$ to $AG_{14}$ such that the two partial beams of rays are again focused by a cylindrical-lens function transversely to the measuring direction, the additional deflection being different, however. Thus, the partial beams of rays may be conducted separately via mirrors to scanning gratings $AG_{A1}$ to $AG_{A4}$ and $AG_{B1}$ to $AG_{B4}$ which collimate the partial beams of rays again and direct them to separate scanning-location pairs $RM_A$ and $RM_B$ onto measuring standard MP. For this, reference is made to FIG. 5a. The corresponding grating structures of scanning gratings $AG_{11}$ to $AG_{14}$ are illustrated exemplarily in FIG. 6c. They include two superposed grating structures as shown in FIGS. 6a and 6b, which in each case form one of the two exiting partial beams of rays. Thus, two pairs of scanning units are operated with light source $L_1$. The first pair is formed by scanning-location pairs $RM_1$ and $RM_A$ and represents a first pair of scanning units. The second pair is formed by scanning-location pairs $RM_1$ and $RM_B$ and represents a second pair of scanning units. Light source L1 thus supplies a total of four scanning units.

Scanning gratings $AG_{A1}$ to $AG_{A4}$ are also formed in analogous manner as superposed grating structures. The function of scanning gratings $AG_{A1}$ to $AG_{A4}$, however, is the uniting of the partial beams of rays which are emitted from a first light source $L_1$, with those which are emitted from a second light source $L_2$. Scanning gratings $AG_{A1}$ to $AG_{A4}$ therefore act as a demultiplexer, their grating structure being analogous to that in illustrated in FIG. 6c.

Figure 5A:
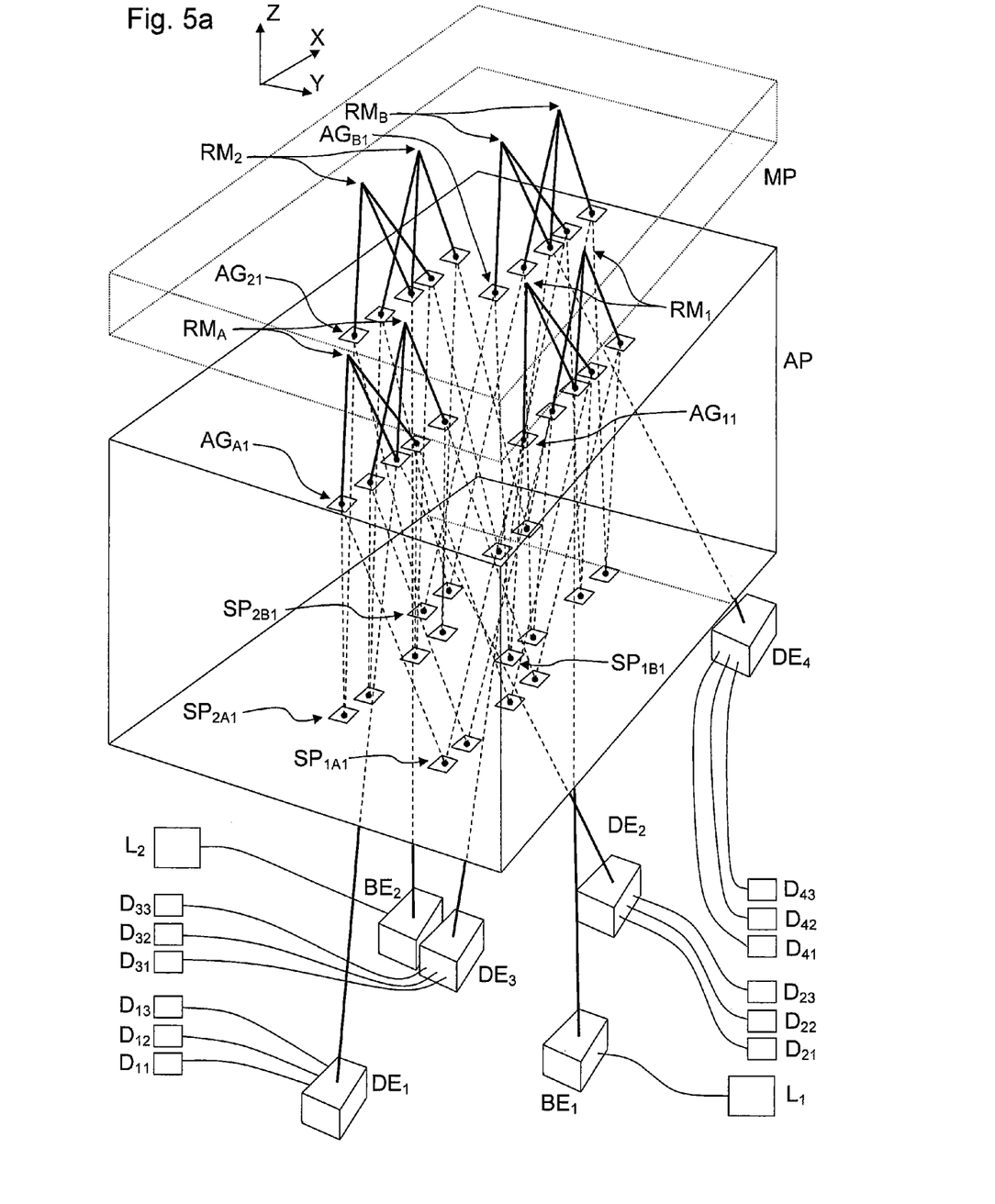
FIGS. 5a and 5b schematically illustrate a third exemplary embodiment of the position-measuring system.
Figure 5B:
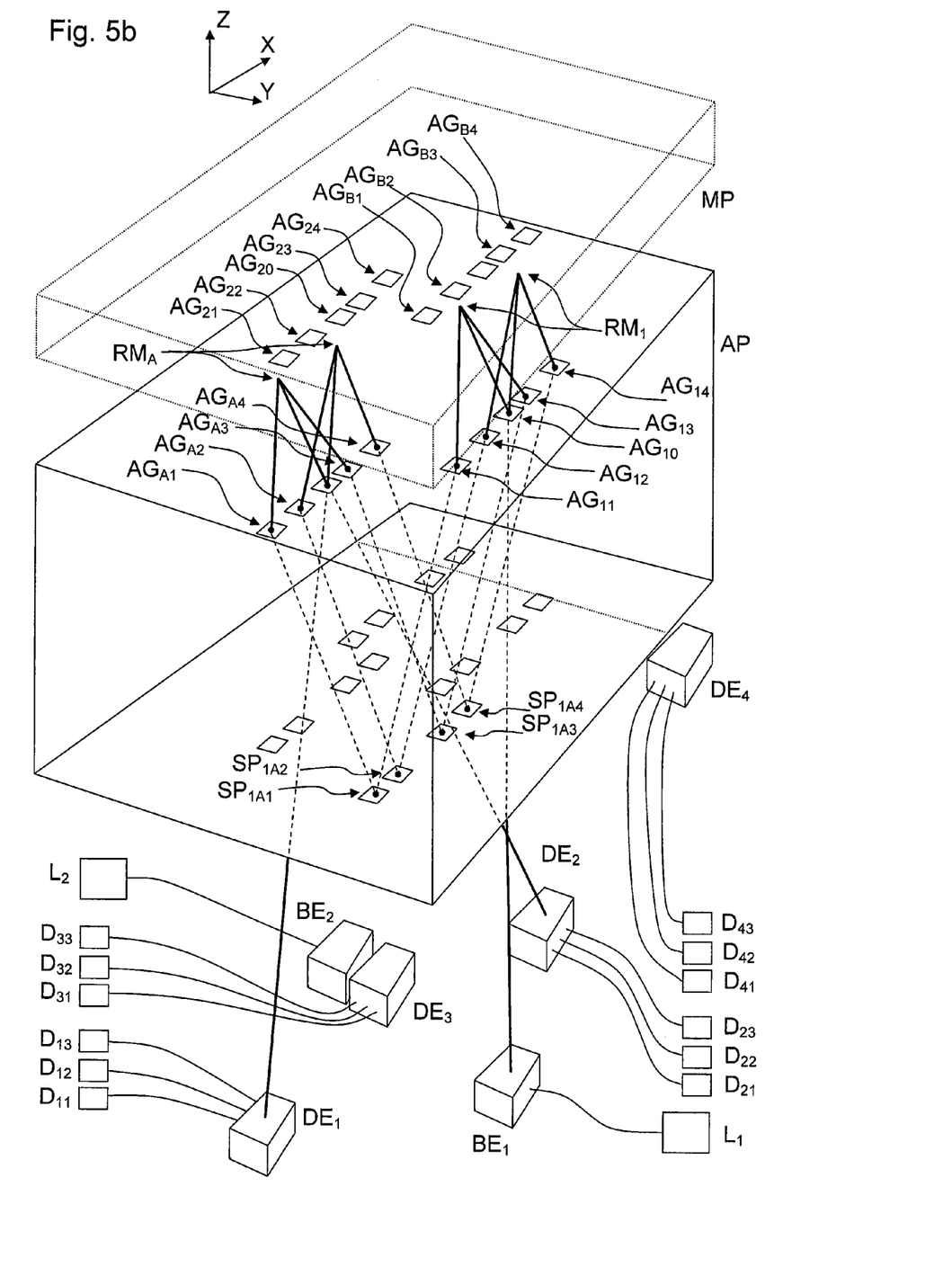
Figure 6A:
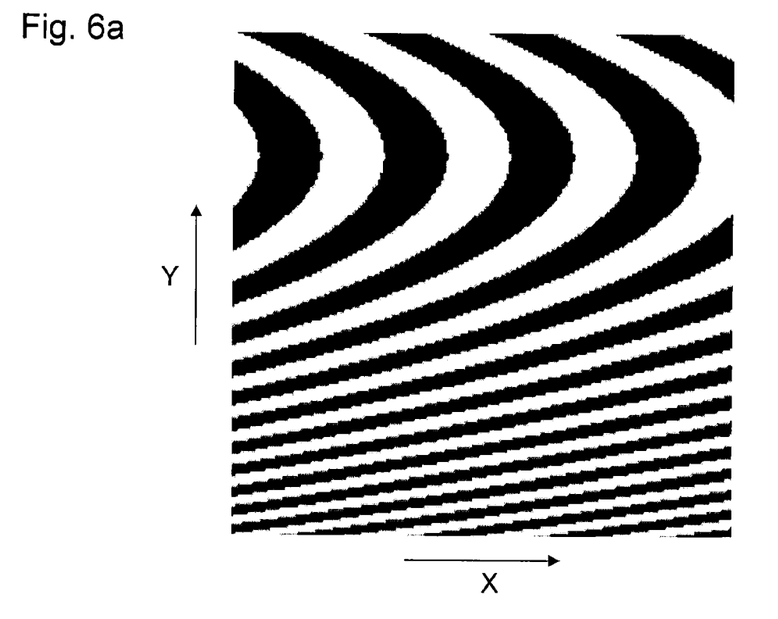
FIGS. 6a to 6c illustrate gratings used in the third exemplary embodiment of the position-measuring system.
Figure 6B:
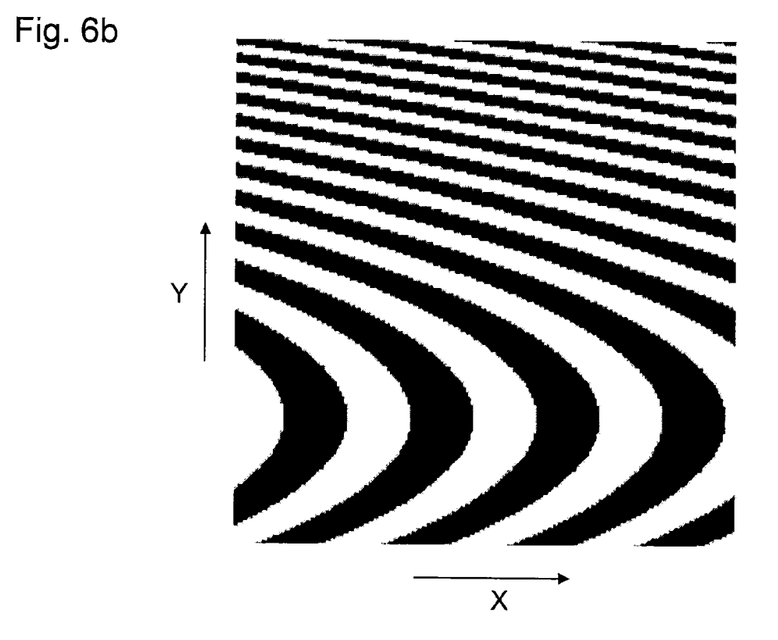
Figure 6C:
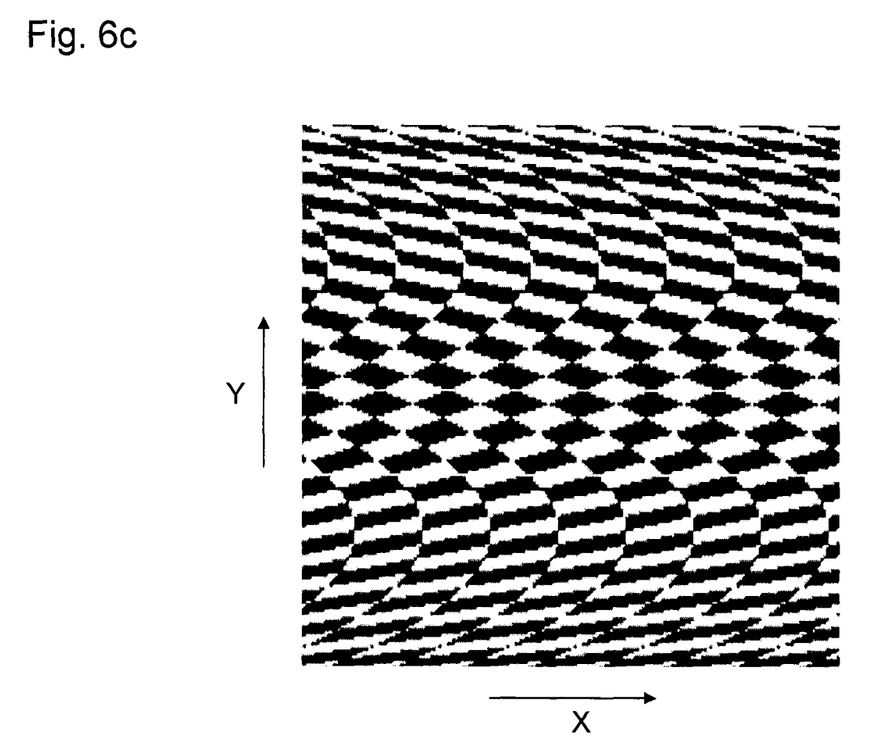

FIG. 5a illustrates all beams of rays and partial beams of rays together. In this case, 4 scanning-location pairs $RM_1$, $RM_2$, $RM_A$, $RM_B$ may be discerned on measuring standard MP. Scanning-location pairs $RM_1$, $RM_A$ and $RM_B$ are assigned to light source $L_1$, and scanning-location pairs $RM_2$, $RM_A$ and $RM_B$ are assigned to light source $L_2$. Consequently, the operation of eight scanning units with two light sources $L_1$, $L_2$ and four groups of detectors $D_{11}$, $D_{12}$, $D_{13}$ and $D_{21}$, $D_{22}$, $D_{23}$ and $D_{31}$, $D_{32}$, $D_{33}$ and $D_{41}$, $D_{42}$, $D_{43}$, respectively, is possible.

A particular advantage of this exemplary embodiment of the position-measuring system is that scanning gratings are used simultaneously in a plurality of scanning units. This considerably reduces the number of scanning gratings required, thus permitting an especially compact configuration of the scanning units. The scanning locations of the individual scanning units may thus be placed very close to one another. In addition, this improves the quality of a self-calibration, which is possible with this arrangement of redundant scanning units.

Besides the exemplary embodiments described above, other configurations are possible without departing from the spirit and scope hereof.

Thus, for example, in the second example embodiment of the position-measuring system described above, the multiplexer is two-stage in the form of a beam splitter and a splitting grating. In principle, however, both the multiplexers and the demultiplexers may be multi-stage, that is, provided in cascaded fashion. For example, polarizing or non-polarizing beam splitters, one-dimensional or two-dimensional gratings, optical-fiber branching elements (Y-shaped branching elements or multi-channel branching elements) and lens configurations in which one large lens is disposed relative to a plurality of small lenses are suitable for this purpose. In the case of a multiplexer, such a lens configuration includes one large lens, for example, which collimates the light beam of one fiber optic, and the expanded collimated light beam is subsequently focused by a plurality of side-by-side small lenses onto a plurality of assigned fiber optics.

Moreover, instead of the use of a plurality of light sources operated in pulsed fashion, the beams of rays emitted by a single light source may be split by additional multiplexers into a plurality of partial beams of rays, and these partial beams of rays may be allowed to pass through delay routes of varying length. That is to say, in such a variant of the position-measuring system, the plurality of light sources operable in pulsed fashion one after another in time may include a single light source operable in pulsed fashion, one splitting element, and a plurality of delay routes. In this case, the partial beams of rays delayed relative to each other replace the individual light sources from the example embodiments described above, so that in such a variant, only one light source is necessary physically in the position-measuring system. In the case of such a formation of the plurality of light sources, a plurality of virtual light sources are thus present in the position-measuring system.

What is claimed is:

1. A position-measuring system, comprising:
    a plurality of light sources that operate in temporal succession to emit light pulses in temporal order;
    a plurality of detectors;
    at least one measuring standard including a substrate and a grating provided on the substrate;
    a plurality of optical scanners adapted to optically scan the measuring standard, the scanners being coupled optically to the detectors and a respective light source; and
    a plurality of demultiplexers arranged between the scanners and the detectors, each demultiplexer adapted to couple at least two scanners to one detector;
    a plurality of multiplexers adapted to couple the light sources to the scanners, each multiplexer adapted to split one primary illuminating channel of a light source received on an input side of the multiplexer into a plurality of secondary illuminating channels on an output side of the multiplexer and direct the secondary illuminating channels to the scanners; and
    wherein the scanners are arranged such that per scanner, a plurality of phase-shifted optical scanning signals are generatable and are routable via a plurality of primary detection channels to an input side of the demultiplexers, each demultiplexer having an output side and being adapted to combine the routed primary detection channels on the output side onto a single respective secondary detection channel and direct the secondary detection channel to a single respective detector.

2. The position-measuring system according to claim 1, further comprising single-mode fiber optics arranged between the light sources and the scanners for the optical coupling.

3. The position-measuring system according to claim 1, further comprising multimode fiber optics arranged between the scanners and the detectors for the optical coupling.

4. The position-measuring system according to claim 1, wherein for the optical coupling beam paths propagating in free space are provided between the light sources and the scanners and/or beam paths propagating in free space are provided between the scanners and the detectors.

5. The position-measuring system according to claim 1, wherein the light sources are adapted to emit radiation having the same wavelength.

6. A position-measuring system, comprising:
    a plurality of virtual light sources that operate in temporal succession to emit light pulses in temporal order;
    a plurality of detectors;
    at least one measuring standard including a substrate and a grating provided on the substrate;
    a plurality of optical scanners adapted to optically scan the measuring standard, the scanners being coupled optically to a plurality of detectors and to a respective light source; and
    a plurality of demultiplexers arranged between the scanners and the detectors, each demultiplexer adapted to couple at least two scanners to one detector;
    a plurality of multiplexers adapted to couple the light sources to the scanners, each multiplexer adapted to split one primary illuminating channel of a light source received on an input side of the multiplexer into a plurality of secondary illuminating channels on an output side of the multiplexer and direct the secondary illuminating channels to the scanners;
    wherein the scanners are arranged such that per scanner, a plurality of phase-shifted optical scanning signals are generatable and are routable via a plurality of primary detection channels to an input side of the demultiplexers, each demultiplexer having an output side and being adapted to combine the routed primary detection channels on the output side onto a single respective secondary detection channel and direct the secondary detection channel to a single respective detector; and
    wherein the plurality of virtual light sources operable in pulsed fashion one after another in time is provided by an assembly having a single light source operable in pulsed fashion, a splitting element, and a plurality of delay routes.

7. The position-measuring system according to claim 1, wherein the multiplexer includes a splitting grating disposed on a scanning plate in the scanning beam path.

8. The position-measuring system according to claim 7, wherein the multiplexer also includes a beam-splitting mirror.

9. The position-measuring system according to claim 8, wherein the demultiplexer includes a plurality of gratings.

10. The position-measuring system according to claim 1, wherein the multiplexer and the demultiplexers are integrated into optical components of the scanner.

11. The position-measuring system according to claim 10, wherein several scanning gratings of the scanning optics are arranged as a multiplexer and other scanning gratings of the scanning optics are arranged as a demultiplexer.

12. A method for operating a position-measuring system including a plurality of optical scanners for optical scanning of at least one measuring standard, the measuring standard including a substrate and a grating provided on the substrate, the scanners being coupled optically to a plurality of light sources and a plurality of detectors, comprising:
    supplying phase-shifted scanning signals of at least two scanners to one detector via a plurality of demultiplexers disposed between the scanners and the detectors;
    operating the light sources in temporal succession to emit light pulses in temporal order, the light sources being coupled to all scanners by a plurality of multiplexers;

splitting, by each multiplexer, one input-side primary illuminating channel of the multiplexer corresponding a light source onto a plurality of secondary illuminating channels on an output side of the multiplexer and directing to the secondary illuminating channels to the various scanners;

routing the plurality of optical scanning signals generated per scanner in each case by a plurality of primary detection channels to an input side of the demultiplexers; and combining the routed primary detection channels on an output side of the demultiplexer onto one secondary detection channel and directing the secondary detection channel to one detector.

* * * * *